United States Patent
Booth (10) Patent No.: US 7,372,946 B2
(45) Date of Patent: May 13, 2008

(54) MEASUREMENT DEFERRAL AND AGGREGATION FOR EXTENSIBLE TEST CONFIGURATION

(75) Inventor: Stephen C. Booth, Fort Collins, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 1084 days.

(21) Appl. No.: 10/732,250

(22) Filed: Dec. 11, 2003

(65) Prior Publication Data

US 2005/0129183 A1 Jun. 16, 2005

(51) Int. Cl.
*H04M 1/24* (2006.01)
*H04M 3/08* (2006.01)

(52) U.S. Cl. .................... 379/1.01; 370/241; 370/252; 709/224; 709/230

(58) Field of Classification Search ............. 379/1.01, 379/1.04, 9, 9.04, 10.01, 10.03, 15.01, 15.03, 379/23–24, 29.01, 29.11; 370/241–241.1, 370/252; 709/224, 230
See application file for complete search history.

(56) References Cited

U.S. PATENT DOCUMENTS

| | | | |
|---|---|---|---|
| 7,299,277 B1 * | 11/2007 | Moran et al. ............... | 709/224 |
| 2002/0124108 A1 * | 9/2002 | Terrell et al. ............... | 709/245 |
| 2002/0161907 A1 * | 10/2002 | Moon ......................... | 709/230 |
| 2003/0120822 A1 * | 6/2003 | Langrind et al. .......... | 709/251 |
| 2004/0001579 A1 * | 1/2004 | Feinberg et al. ........... | 379/156 |

* cited by examiner

*Primary Examiner*—Binh K. Tieu (57) ABSTRACT

A system having a diagnostic measurement system (DMS) and method include a multi-protocol application test identifying components corresponding to protocols mixed within the multi-protocol application test, executing the protocols to collect measurements of the components, combining the measurements of the components to generate measurements corresponding to the multi-protocol application test, and outputting the measurements of the multi-protocol application test to the DMS, wherein the multi-protocol application test defers outputting the measurements of the components to the DMS as the measurements are collected from each protocol.

20 Claims, 3 Drawing Sheets

MEASUREMENT DEFERRAL AND AGGREGATION FOR EXTENSIBLE TEST CONFIGURATION

BACKGROUND OF THE INVENTION

1. Field of the Invention

The present invention is directed to a field of network for testing and measuring telecommunication networks. More particularly, the present invention is directed to a measurement of action-capture network components and a deferral and aggregation thereof for a network test configuration.

2. Description of the Related Art

In testing and measurement of network environments, such as telecommunications environments, carriers or wireless companies execute tests and capture and deliver measurements of the tests to a database, which is later used to analyze the network. Tests that may be performed, for instance, are service assurance tests. Moreover, multi-protocol applications are becoming popular with wireless mobile device (e.g., cell phone) users. Some examples of these multi-protocol applications are e-mail to short messages and vice versa, web HTTP (hypertext transfer protocol), to short messages, and others.

The multi-protocol applications have two common characteristics: (1) The multi-protocol applications use a combination of wireless, Internet and telephony protocols to complete an application transaction. Such protocols include SMS (short message service), WAP (wireless application protocol), HTTP, and SMTP (simple mail transfer protocol); and (2) some parts of the multi-protocol applications are connection-based; that is, the multi-protocol applications establish and maintain a connection to a server or service to support data upload/download, while other parts of the multi-protocol applications are connectionless; that is, the multi-protocol applications use a best-effort-only message delivery system Traditional tests for these types of multi-protocol applications are self-contained tests of the component protocols, which yields a fragmented status of the multi-protocol applications. The self-contained tests are tests where measurements are taken or captured of components of the wireless, Internet, and the telephony protocols included in a particular multi-protocol application and those measurements are delivered to the carrier.

However, not all the measurements of the components of the Internet and the telephony protocols are needed to generate meaningful measurements of the multi-protocol application. Accordingly, the carrier must further process the measurements to generate meaningful measurements pertaining to the particular multi-protocol application. Specifically, the carrier must select and extract specific measurements of components that were taken of the wireless, Internet and the telephony protocols that are necessary to provide meaningful measurements of the multi-protocol application.

A system and method are needed that would break down the capture and the delivery of the measurements so that meaningful measurements are obtained pertaining to a multi-protocol protocol. Further, a system and method are needed that provide more flexibility in accommodating different types of protocols and in how a test can aggregate information from multiple protocols to produce meaningful measurements of the multi-protocol protocol.

Thus, a system and method are necessary that would re-structure or take a model of an existing protocol test and break the test into pieces and re-organize those pieces to generate therefrom meaningful test results. A system and method are necessary that can quickly be built using various combinations of components that correspond to different types of protocols.

SUMMARY OF THE INVENTION

According to an aspect of the present invention, there is provided a system having a diagnostic measurement system (DMS), including: a multi-protocol application test identifying components corresponding to protocols mixed within the multi-protocol application test, executing the protocols to collect measurements of the components, combining the measurements of the components to generate measurements corresponding to the multi-protocol application test, and outputting the measurements of the multi-protocol application test to the DMS, wherein the multi-protocol application test defers outputting the measurements of the components to the DMS as the measurements are collected from each protocol.

According to an aspect of the present invention, there is provided a method to measure a multi-protocol application test in an agent that is connected to a diagnostic measuring system (DMS), including: identifying components corresponding to protocols mixed within the multi-protocol application test; executing the protocols to collect measurements of the components; defer outputting of the measurements of the components to the DMS as the measurements are collected from each protocol; combining the measurements of the components of the protocols to generate measurements corresponding to the multi-protocol application; and outputting the measurements of the multi-protocol application to the DMS.

According to an aspect of the present invention, there is provided a method to measure a multi-protocol application test in an agent that is connected to a diagnostic measuring system (DMS) of a network under test, including: identifying components corresponding to the multi-protocol application test; extracting attributes from the multi-protocol application test to collect measurements of the components; defer outputting of the measurements of the components to the DMS as the measurements are collected; selecting specific measurements from the collected measurements of the components; and combining the selected measurements of the components with arbitrary data to generate measurements corresponding to the multi-protocol application test.

According to an aspect of the present invention, there is provided a method to measure a multi-protocol application test in an agent connected to a diagnostic measuring system (DMS), including: identifying components of the multi-protocol application to be measured; identifying protocols within the multi-protocol application test that correspond to the identified components; executing each of the protocols to extract from the multi-protocol application test attributes that each of the protocols needs, and to collect measurements associated with the identified components; defer outputting the measurements of the components from the protocols to the DMS; capturing arbitrary data from a network under test; aggregating the measurements of the components of the protocols; selecting specific measurements from the aggregated measurements of the components; combining the specific measurements of the components with the arbitrary data; generating the measurements of the multi-protocol application test; and outputting the measurements of the multi-protocol application test from the agent to the DMS.

Additional aspects and advantages of the invention will be set forth in part in the description which follows and, in part, will be obvious from the description, or may be learned by practice of the invention.

BRIEF DESCRIPTION OF THE DRAWINGS

These and other aspects and/or advantages of the present invention will become apparent and more readily appreciated from the following description of the embodiments, taken in conjunction with the accompany drawings of which.

DETAILED DESCRIPTION OF THE PREFERRED EMBODIMENTS

Reference will now be made in detail to the aspects of the present invention, examples of which are illustrated in the accompanying drawings, wherein like reference numerals refer to like elements throughout. The aspects are described below in order to explain the present invention by referring to the figures.

WAP, for instance, is a family of protocols based on wireless and Internet standards (e.g., XHTMLMP, XML, WSP, WTP, WP-TCP) and includes a WML language specification, a WMLScript specification, and a Wireless Telephony Application Interface (WTAI) specification. Some of the WAP-related measurements that may be taken by a test component are time duration to connect to the WAP gateway, time duration to download specified web pages, time duration to download any embedded objects within the web pages, etc. The measurements give carriers and other wireless companies an idea of a performance level of their network environment. Other test measurements may be needed when directly connected to a LAN, for instance, HTTP testing.

Examples of some services that may be provided by carriers and other wireless companies in various implementations of the present invention include electronic mail (e-mail), Interactive Voice Response (IVR), Short Message Services (SMS) or Multimedia Messaging Service (MMS), Wireless Access Protocol (WAP) and Hypertext Transfer Protocol (HTTP). These services are continuously tested by the carriers for connectivity and quality assurance.

The carriers and other wireless companies are dealing with more complicated wireless environment where it is not only sufficient to determine whether connectivity to the gateway is possible, but a number of tests are necessary to evaluate the wireless environment. However, an interplay may exist between protocols where, for instance, to perform a multimedia message service (MMS) test, a web page must be accessed and some contents must be typed-in, which are sent to an MMS Service Center. The MMS Service Center then sends a short message service (SMS) message to a mobile phone, the mobile phone recognizes the existence of the SMS message and various objects embedded in the SMS message, which directs the mobile phone to access a specific Web server and obtain a wireless markup language (WML) page and send that page back to an associated Web browser. Thus, to evaluate the MMS test, an SMS test, a WAP test, and other types of protocol tests must be performed.

Similarly, the carriers and other wireless companies have a need of receiving test results from protocols, which at times, are based on measurements or components from a mixture of other protocols. For instance, a mobile phone uses WSP (WAP Session Protocol) over WTP (Wireless Transport Protocol) to talk to the WAP gateway, and the WAP gateway uses HTTP to talk to the content server, and the content server interacts with a Post Office Protocol (POP3) server. It will be up to the carrier to identify the components and measurements of interest for a given multi-protocol application test.

In conventional diagnostic systems, there is no flexibility in the testing environment where the measurement components corresponding to each protocol are needed to be deferred and later aggregated to output measurements corresponding to a multi-protocol application test (e.g., MMS test or WAP test) of interest.

According to an aspect of the present invention, a diagnostic system and method are provided where a multi-protocol application test to be executed is broken down into components that correspond to various protocols. An agent may execute the multi-protocol application test. The agent is a hardware and a software that executes application tests as directed by a diagnostic measurement system (DMS) and sends back test measurement results to the DMS. The DMS is a system connected to at least one agent and contains test definitions that the at least one agent will use to execute the application tests. The DMS receives and stores the test measurements obtained by the at least one agent. The multi-protocol application test is based on measurements of the components from the various protocols. These protocols are mixed within the multi-protocol application test. Each component uses attributes from the multi-protocol application test that are relevant to each corresponding component. Attributes are properties of the multi-protocol application test, such as a telephone number, area codes, subscriber ID, timeout, location, home location registry, host IP address, host port number, WAP gateway address, MMS service center address, URL, roaming ID, call duration, download threads, local bind IP address, number of retries, content validation, etc. Once each protocol is performed and measurements are obtained therefrom, rather than outputting the measurements for each protocol to the DMS, the multi-protocol application test selects those measurements that are necessary for the multi-protocol application test to be evaluated. The multi-protocol application test aggregates the selected component measurements and measurements of arbitrary data that may be also relevant for a meaningful measurement of the multi-protocol application test, to produce measurements meaningful to the evaluation thereof. The agent then delivers the test measurement results of the multi-protocol application test to the DMS, for use by the carrier.

Thus, according to an aspect of the present invention, rather than testing or evaluating all the protocols and delivering the measurements corresponding to each protocol, the measurements obtained from each protocol are captured and deferred until the measurements for the multi-protocol application test that the carrier is concerned with are completely obtained, thereby providing meaningful test results of the multi-protocol application. Also, according to an aspect of the present invention, the diagnostic system and method provide a flexible system able to accommodate processing of various protocols concerning the multi-protocol application test.

Figure 1:
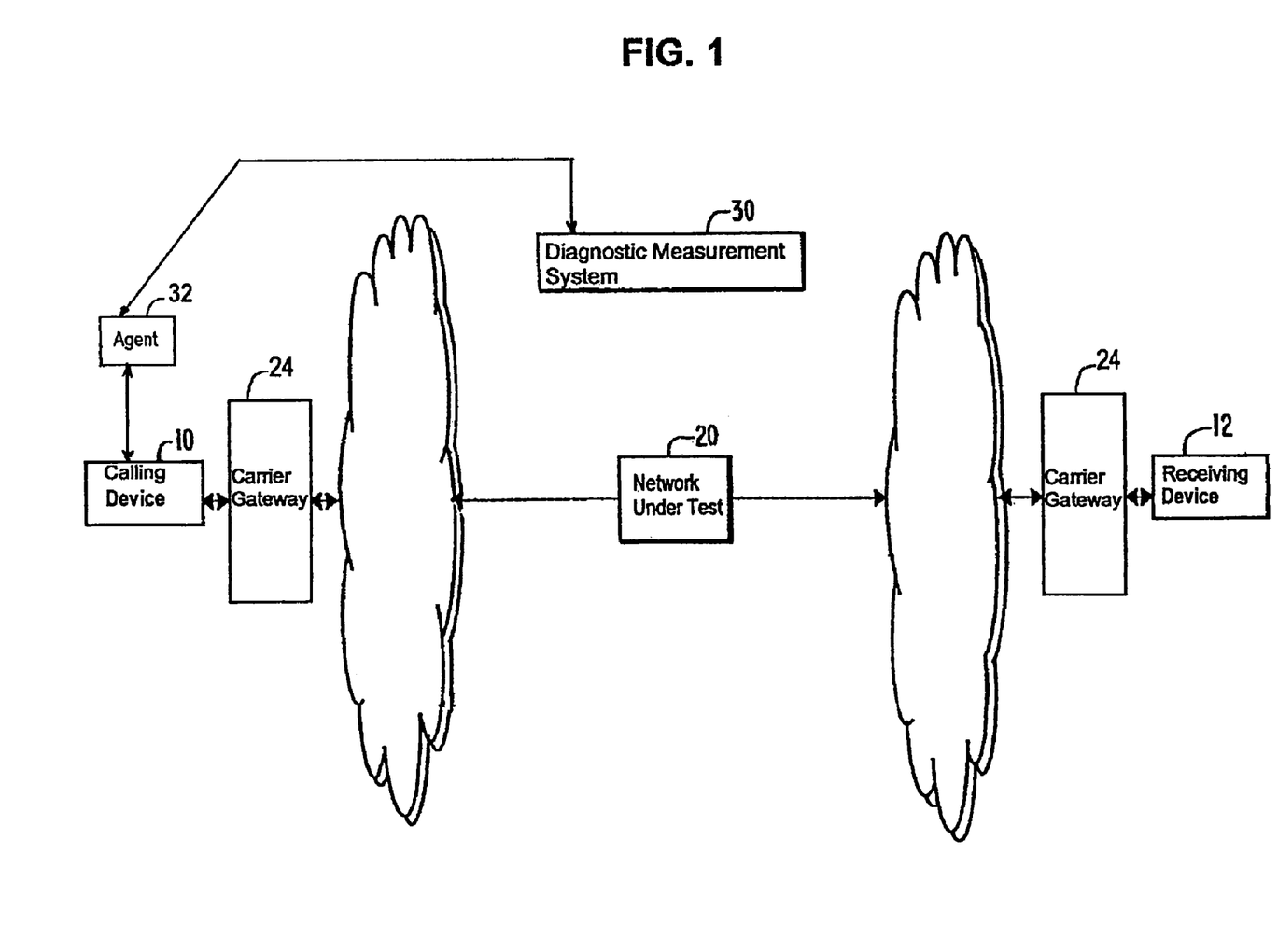
FIG. 1 is a diagram illustrating a configuration of a telecommunications system using a diagnostic measurement system, in accordance with an aspect of the present invention.

FIG. 1 is a diagram illustrating a configuration of a telecommunications system, which captures and defers measurements of a network under test using a diagnostic measurement system, in accordance with an aspect of the present invention. A calling device 10 and a receiving device 12 access a telecommunications network 20 through carrier gateways 24. The calling device 10 and the receiving device 12 may each include a POTS telephone, a cellular telephone, a satellite telephone, a web telephone, a personal digital assistant (PDAs), a video telephone, a set top telephone, etc. Further, the telecommunications network 20 may be a network such as LAN/WAN, wireless, or IP network and the calling and receiving devices 10 and 12 may be wireless phones. The carrier gateways 24 route calls between the source 10 and the receiver 12 over the network 20.

According to an aspect of the present invention, the DMS 30 is connected to the agent 32, which in turn is connected to the calling device 10. The agent 32 may include a processor having permanent or removable storage, such as magnetic and optical discs, RAM, ROM, etc., on which the process or method and data structures of the present invention can be stored and executed. Although there is shown one telecommunications network 20, there may be more than one. Further, although only one agent 32 is shown in FIG. 1, a person of ordinary skill in the art will appreciate that multiple agents may be connected to the calling device 10 and/or the receiving device 12.

Figure 2:
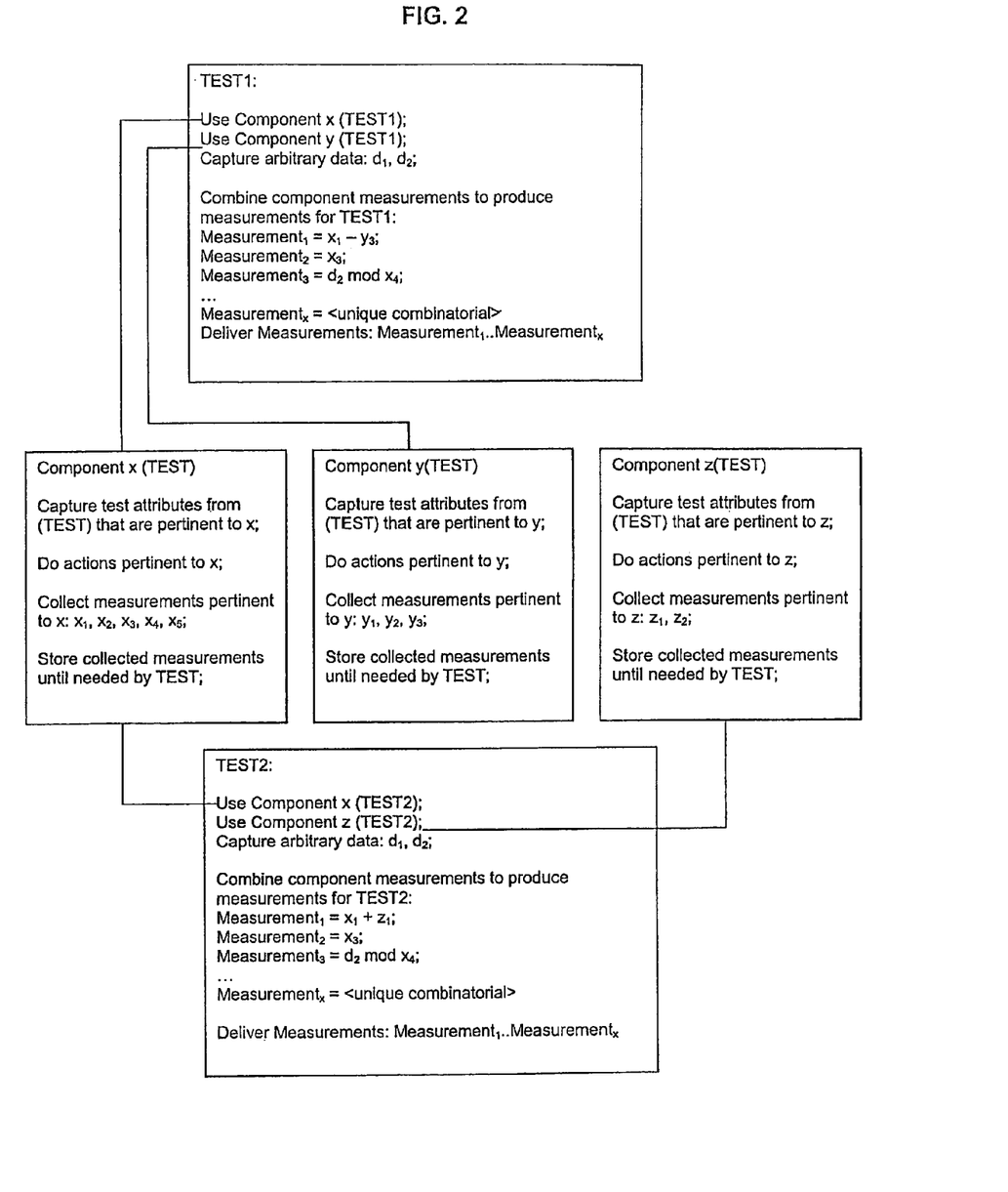
FIG. 2 is a diagram illustrating a multi-protocol application test, in accordance with an aspect of the present invention.

FIG. 2 is a diagram illustrating the multi-protocol application test, TEST1, implemented in the agent 32, in accordance with an aspect of the present invention. TEST1 is the multi-protocol application test that the DMS 30 has identified as requiring to be tested to analyze the network 20 under test. For illustrative purposes, TEST1 may be a test for an MMS protocol.

TEST1 includes components that have been determined to be necessary to measure the network 20 under test. The DMS 30 provides to TEST1 any information or test definitions that TEST1 and the protocols mixed within TEST1 would need to generate meaningful measurements of TEST1. Because the test definitions that the DMS 30 provides to TEST1 may vary depending upon the particular multi-protocol application test or TEST1, the DMS 30, according to an aspect of the present invention, allows the agent 32 to execute multiple times the protocols mixed within TEST1 using the same code but using different attributes depending on the TEST1 being measured. Thus, the diagnostic system and method thereof, according to an aspect of the present invention, provides a flexible system able to accommodate processing of various protocols concerning a multi-protocol application test. Further, the attributes that may be pertinent to the measurement of the components are extracted from TEST1.

Within a single test environment or within a programming environment, the agent 32 executes the TEST1, which uses the components corresponding to the protocols mixed therein to collect and store the measurements for the protocols, and combines selected measurements of the components and arbitrary data from the network 20 under test, for instance, to produce meaningful measurements of TEST1 to the DMS 30.

As shown in FIG. 2, TEST1 identifies component x and component y. Then, TEST1 identifies and executes the protocols associated with the component x and the component y. The protocol (e.g., an SMS protocol) corresponding to the component x is executed where attributes that are relevant to the measurement of the component x are extracted from TEST1, and the measurements pertinent to the component x (x1, x2, x3, x4, x5) are aggregated or collected. In addition, contrary to conventional systems, rather than outputting the measurements pertinent to the component x to the DMS 30 as the measurements are obtained, the measurements of the component x are deferred from being output to the DMS 30. Rather, the measurements of the component x are aggregated until needed by TEST1 (i.e., the MMS protocol).

Also, The diagnostic measurement system 30 executes the protocol (e.g., a WAP protocol) corresponding to the component y where attributes that are relevant to the measurement of the component y are extracted from TEST1, and collects the measurements pertinent to component y (y1, y2, y3). In addition, the measurements of the component y are aggregated until needed by TEST1.

Although for purposes of brevity only two protocols are executed, a person of ordinary skill in the art will appreciate that the agent 32 may execute multiple tests corresponding to multiple protocols to obtain measurements for as many components as needed by TEST1.

Once the measurements pertaining to all the components that affect TEST1 are measured and stored, TEST1 may select specific measurements from the aggregated or collected measurements obtained for each component x and y. TEST1 may also combine the selected measurements of the components x and y with the arbitrary data (e.g., d1 and d2) from the network 20 under test that is also relevant for the measurement of TEST1. TEST1 then further processes the measurements of the components from all the protocols mixed within TEST1, along with the arbitrary data, to generate therefrom measurements that are sent to the DMS 30 for an adequate evaluation of the network 20 under test.

In the event that the network 20 under test requires more than one multi-protocol application test for an adequate evaluation thereof, the agent 32, simultaneously or once TEST1 is completed (i.e., the MMS protocol), may conduct another multi-protocol application test, TEST2. For TEST2, components x (e.g., the SMS protocol) and z are required. Because pertinent measurements corresponding to component x were obtained in TEST1, only component z must be determined. Similar actions are performed to determine the measurements of component z as those performed to determine the measurements corresponding to components x and y. Similarly to TEST1, TEST2 extracts the pertinent measurements of the components x and z from the protocol corresponding to component x (e.g., the SMS protocol) and from the protocol corresponding to component z, respectively, and further processes the measurements of the components from all the protocols mixed within TEST2, along with the arbitrary data, if necessary, to generate therefrom measurements that are sent to the DMS 30 for an adequate evaluation of the network 20 under test. In the event that the carrier would specifically need measurement results obtained from the protocol corresponding to component x (e.g., the SMS protocol), the diagnostic measurement system 30 may include another test, Test3, which would expressly provide the measurements of the components obtained in the protocol corresponding to component x (e.g., the SMS protocol).

Figure 3:
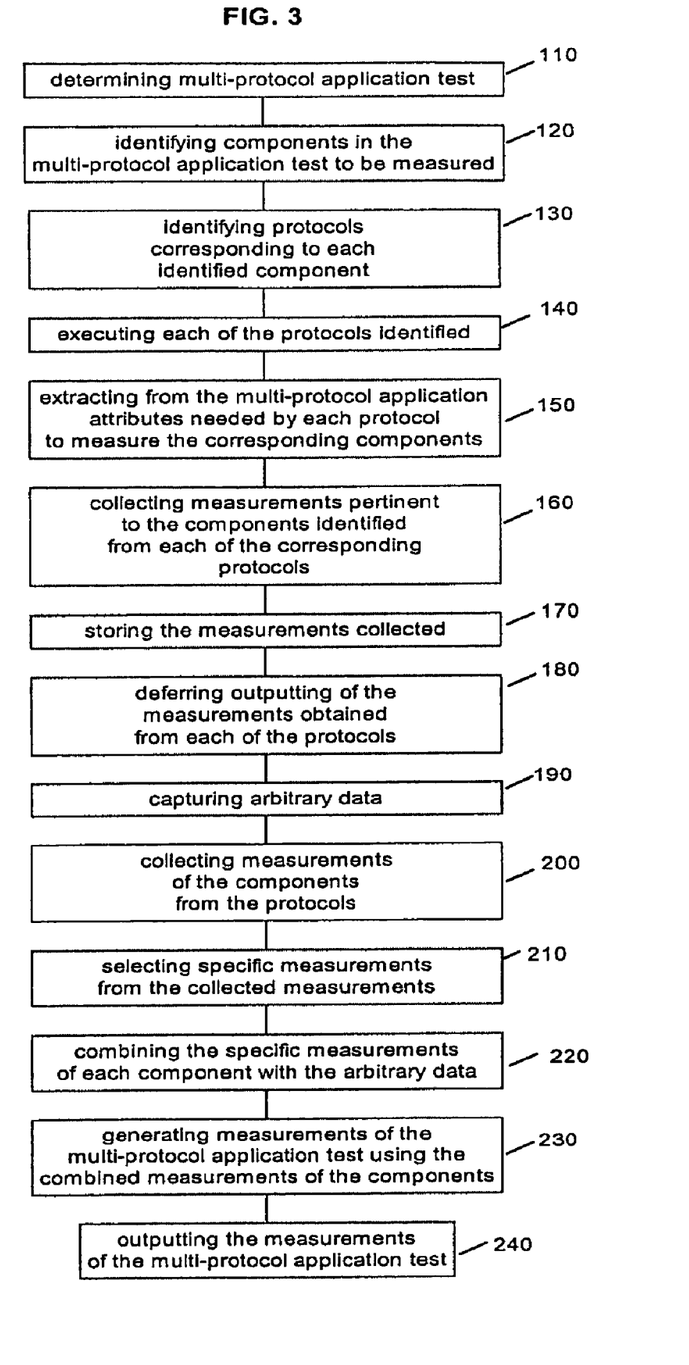
FIG. 3 is a diagram illustrating the multi-protocol application test, in accordance with an aspect of the present invention.

FIG. 3 is a diagram illustrating a method performed by the multi-protocol application test in the agent 32, in accordance with an aspect of the present invention. At operation 110, the DMS 30 determines which multi-protocol application test needs to be tested. At operation 120, the multi-protocol application test identifies the components that need to be measured. At operation 130, the multi-protocol application test identifies the protocols mixed within the multi-protocol application test that correspond to each identified component. At operation 140, each of the protocols are executed which are identified as being associated with one or more of the components that need to be measured. At operation 150, each of the protocols extracts from the multi-protocol application test the attributes that each of the protocols may need to obtain adequate or meaningful measurements of the components. As previously set forth, the protocols may be simultaneously executed or executed following a predetermined execution sequence.

At operation 160, the multi-protocol application test collects the measurements associated with the components identified from each of the protocols. At operation 170, the measurements collected corresponding to the components in each protocol are stored. At operation 180, as the measurements are collected from each protocol, the multi-protocol application test defers outputting the measurements of the components of the protocols to the DMS 30. At operation 190, the multi-protocol application test captures, if needed, the arbitrary data (e.g., d1 and d2) from the network 20 under test that is also relevant for the measurement of the multi-protocol application test. At operation 200, the multi-protocol application test collects the measurements of the components from all the protocols. At operation 210, the multi-protocol application test selects specific measurements from the collected measurements of the components to evaluate the multi-protocol application test, and, at operation 220, combines the specific measurements pertinent to each component with the arbitrary data, if needed, in a manner that is meaningful to the multi-protocol application, thereby, at operation 230, generating the measurements of the multi-protocol application test. At operation 240, the measurements of the multi-protocol application test are output from the agent 32 to the DMS 30.

In accordance with an aspect of the present invention, the following is an example of a language source code performed by the multi-protocol application test, in accordance with an aspect of the present invention. Of course, the present invention is not limited to this example source code. The source code may be implemented using various languages and protocols, such as Java, XML, C++, Perl, Visual Basic, etc. However, the present invention is not limited to these languages and protocols, and others can be used.

```
1     Code1:Sample code fragments of a test that uses action-capture components,
2          and the highlights of the action-capture components that are used.
3
4
5     /**
6      * This test uses action-capture classes to do its work. The classes
7      * appear later in this document.
8      */
9
10    public class ArbitraryTest {
11
12        protected StackIface iface            = null;
13        protected Connect       connect       = null;
14        protected Action        action        = null;
15        protected Disconnect    disconnect    = null;
16
17        protected Measurements meas = new measurements( );
18
19        protected Measurements connectMeas;
20        protected Measurements actionMeas;
21        protected Measurements disconnectMeas;
22
23        public ArbitraryTest( ) { }
24
25        /*
26         * @param    t    the target object containing the test attributes.
27         */
28        protected void executeStart(Target t)
29        {
30            if (null == {iface = StackIface.create(false, this))) {
31                return;
32            }
33            connect = new Connect(iface);
34            connect.getAttributes(this);
35            action = new Action(iface);
36            action.getAttributes(this);
37            disconnect = new Disconnect(iface);
38            //There are no disconnect attributes
39        }
40
41        /**
42         *This executes the test.
43         */
44        protected void executeRun( )
45        {
46            if (checkForErrors( )) {
47                ...
48                return;
49            }
```

-continued

```
 50            connectMeas = connect.connect(this);
 51            actionMeas = action.doAction(this);
 52            disconnectMeas = disconnect.disconnect(this);
 53            iface.destroy(this);
 54                    . . .
 55        }
 56
 57        /**
 58         *Checks for a standard set of errors.
 59         */
 60        protected Boolean checkForErrors( )
 61        {
 62            . . .
 63            boolean err = connect.chcekForErrors(this);
 64            err |= action.checkForErrors(this);
 65            return err;
 66        }
 67
 68
 69        /**
 70         *Deliver measurements to the database.
 71         */
 72        protected void deliverMeasurements(. . .)
 73        {
 74            //Combine information from connectMeas, actionMeas, and
 75            //disconnectMeas into this test's 'meas' object.
 76            . . .
 77            meas.deliverMeasurements(. . .);
 78        }
 79    }
 80
 81    ================================================================
 82    ================================================================
 83    ================================================================
 84
 85    /**
 86     * StackIface holds information about an external program.
 87     */
 88    public class StackIface {
 89
 90        protected Process proc = null;
 91
 92        . . .
 93
 94        /**
 95         * Reads raw measurement information from the process.
 96         */
 97        protected Measurements getData( )
 98        {
 99            Measurements meas = . . .;
100            return meas;
101        }
102
103        /**
104         * Creates an interface to a new process.
105         */
106        public static StackIface create( )
107        {
108            StackIface si = new StackIface( );
109            . . .
110            si.proc = <create the process>;
111            return si;
112        }
113
114        /**
115         * Destroys an interface to a process.
116         */
117        public int destroy( )
118        {
119            proc.destroy( );
120            return exitStatus of the process;
121        }
122    }
123
124
125    ================================================================
126    ================================================================
127    ================================================================
128
```

-continued

```
129     /**
130      * Data and methods for "connecting"
131      */
132     public class Connect {
133
134         protected Measurements meas;
135         private String GatewayAddress;
136         private StackIface si;
137         ...
138
139
140         /**
141          * Gets connection parameters from a test
142          *
143          * @param test from which attributes are taken
144          */
145         public void getAttributes(BaseTest test)
146         {
147             ...
148             GatewayAddress = test.get("GatewayAddress");
149             ...
150         }
151
152         /**
153          * Checks for a standard set of errors.
154          */
155         public boolean checkForErrors(BaseTest test)
156         {
157             boolean error = false;
158             ...
159             return error;
160         }
161
162         /**
163          * Connects to the specified gateway.
164          */
165         public Measurements connect(BaseTest test)
166         {
167             si.writer.println("GatewayAddress" + GatewayAddress + . . .);
168             meas = si.getData(test); // get measurement and other data
169             return meas;
170         }
171     }
172
173     ================================================================
174     ================================================================
175     ================================================================
176
177     /**
178      * Action houses the data and methods for doing some action using
179      * connected interface.
180      */
181     public class Action {
182
183         protected Measurements meas = new Measurements( );
184         protected String Action; /** what action to take */
185         protected StackIface si;
186         ...
187
188         /**
189          * Gets action attributes from a test's target
190          *
191          *@param test from which to get attributes
192          */
193         public void getAttributes(BaseTest test)
194         {
195             Action = test.getString("Action");
196             ...
197         }
198
199         /**
200          * Checks for a standard set of errors.
201          */
202         public Boolean checkForErrors(BaseTest test)
203         {
204             boolean error = false;
205             ...
206             return error;
207         }
```

-continued

```
208
209        /**
210         * Does the indicated action, and collects measurements.
211         */
212        public Measurements doAction(BaseTest test)
213        {
214            ...
215            si.writer.println("Action" + Action + . . .);
216            meas = si.getData(test); //measurement date
217            return meas;
218        }
219    }
220
221    ====================================================================
222    ====================================================================
223    ====================================================================
224
225    /**
226     * Disconnects the connection.
227     */
228
229    public class Disconnect {
230
231        private StackIface si = null;
232
233        /**
234         * Disconnects, gets final measurements, etc.
235         */
236        public Measurements disconnect(BaseTest test)
237        {
238            ...
239            si.writer.close( );
240            return si.getData(test);
241        }
242    }
```

Thus, according to an aspect of the present invention, a diagnostic system and method define components that make test writing more flexible. The diagnostic measurement system and method allow multi-protocol application tests to use measurements from multiple protocols mixed therein. The diagnostic system and method allow multi-protocol application tests to be written to (1) invoke any number of components (2) decide which of the captured measurements from among the components are meaningful, and (3) deliver measurements based on meaningful aggregations or combinations.

According to an aspect of the present invention, there is provided a system and a method that includes a mixture of protocols driving a multi-protocol application. The system and method break down a capture and a delivery of the measurements of the components associated with protocols in a multi-protocol application test so that meaningful measurements are obtained pertaining to the multi-protocol application test. Further, the system and method of the present invention provide more flexibility in accommodating different types of protocols, and allow aggregation of information from the protocols to produce meaningful measurements of the multi-protocol application test.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

Similarly, the method described in the invention does not need to include all steps and may be modified within the true spirit and scope of the invention.

What is claimed is:

1. A system having a diagnostic measurement system (DMS), comprising:
   a multi-protocol application test identifying components corresponding to protocols mixed within the multi-protocol application test, executing the protocols to collect measurements of the components, combining the measurements of the components to generate measurements corresponding to the multi-protocol application test, and outputting the measurements of the multi-protocol application test to the DMS, wherein the multi-protocol application test defers outputting the measurements of the components to the DMS as the measurements are collected from each protocol.

2. The system as recited in claim 1, wherein the multi-protocol application test is a single test environment or a programming environment that collects and defers the outputting of the measurements obtained from each protocol until the measurements for the multi-protocol application test that the DMS is concerned with are completely obtained.

3. The system as recited in claim 1, wherein the multi-protocol application test selects specific measurements from the collected measurements of the components to generate the measurements corresponding thereto.

4. The system as recited in claim 1, wherein the protocols extract from the multi-protocol application test attributes to generate the measurements of the components.

5. The system as recited in claim 3, wherein the multi-protocol application test captures arbitrary data relevant to the measurement of the multi-protocol application test from the system, and combines the selected measurements of the components with the arbitrary data to generate measurements corresponding to the multi-protocol application.

6. The system as recited in claim 1, wherein the multi-protocol application test executes the protocols simultaneously or following a predetermined execution sequence.

7. The system as recited in claim 1, wherein the multi-protocol application test stores the measurements aggregated of the components of the protocols.

8. A method to measure a multi-protocol application test in an agent that is connected to a diagnostic measuring system (DMS), comprising:
identifying components corresponding to protocols mixed within the multi-protocol application test;
executing the protocols to collect measurements of the components;
defer outputting of the measurements of the components to the DMS as the measurements are collected from each protocol;
combining the measurements of the components of the protocols to generate measurements corresponding to the multi-protocol application; and
outputting the measurements of the multi-protocol application to the DMS.

9. The method as recited in claim 8, further comprising:
selecting specific measurements from the collected measurements of the components; and
evaluating the multi-protocol application using the selected measurements of the components.

10. The method as recited in claim 9, further comprising:
capturing arbitrary data relevant to the measurement of the multi-protocol application test; and
combining the selected measurements of the components with the arbitrary data to generate measurements corresponding to the multi-protocol application test.

11. The method as recited in claim 8, further comprising:
executing the protocols multiple times using different attributes depending on the multi-protocol application test being measured.

12. The method as recited in claim 8, further comprising:
storing the measurements aggregated of the components of the protocols.

13. The method as recited in claim 8, further comprising:
extracting from the multi-protocol application test attributes to generate the measurements of the components.

14. A method to measure a multi-protocol application test in an agent that is connected to a diagnostic measuring system (DMS) of a network under test, comprising:
identifying components corresponding to the multi-protocol application test;
extracting attributes from the multi-protocol application test to collect measurements of the components;
defer outputting of the measurements of the components to the DMS as the measurements are collected;
selecting specific measurements from the collected measurements of the components; and
combining the selected measurements of the components with arbitrary data to generate measurements corresponding to the multi-protocol application test.

15. The method as recited in claim 14, wherein the arbitrary data is extracted from the network under test.

16. The method as recited in claim 14, further comprising:
executing protocols mixed within the multi-protocol application test multiple times using different attributes depending on the multi-protocol application test being measured.

17. The method as recited in claim 14, further comprising:
storing the collected measurements of the components.

18. A method to measure a multi-protocol application test in an agent connected to a diagnostic measuring system (DMS), comprising:
identifying components of the multi-protocol application to be measured;
identifying protocols within the multi-protocol application test that correspond to the identified components;
executing each of the protocols to extract from the multi-protocol application test attributes that each of the protocols needs, and to collect measurements associated with the identified components;
defer outputting the measurements of the components from the protocols to the DMS;
capturing arbitrary data from a network under test;
aggregating the measurements of the components of the protocols;
selecting specific measurements from the aggregated measurements of the components;
combining the specific measurements of the components with the arbitrary data;
generating the measurements of the multi-protocol application test; and
outputting the measurements of the multi-protocol application test from the agent to the DMS.

19. The method as recited in claim 18, further comprising:
storing the measurements aggregated of the components of the protocols.

20. The method as recited in claim 18, further comprising:
executing the protocols simultaneously or following a predetermined execution sequence.

* * * * *